(12) United States Patent
Furuta (10) Patent No.: US 11,187,300 B2
(45) Date of Patent: Nov. 30, 2021

(54) SPEED REDUCER

(71) Applicant: NABTESCO CORPORATION, Tokyo (JP)

(72) Inventor: Kazuya Furuta, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 16/918,834

(22) Filed: Jul. 1, 2020

(65) Prior Publication Data

US 2021/0010564 A1      Jan. 14, 2021

(30) Foreign Application Priority Data

Jul. 9, 2019   (JP) .............................. JP2019-127614

(51) Int. Cl.
*F16H 1/32* (2006.01)

(52) U.S. Cl.
CPC ......... *F16H 1/32* (2013.01); *F16H 2001/323* (2013.01)

(58) Field of Classification Search
CPC ............................ F16H 2001/323; F16H 1/32
See application file for complete search history.

(56) References Cited

U.S. PATENT DOCUMENTS

| | | | |
|---|---|---|---|
| 5,322,485 A | 6/1994 | Haga | |
| 5,472,384 A | 12/1995 | Haga | |
| 5,701,671 A | 12/1997 | Haga | |
| 6,699,152 B2 * | 3/2004 | Tanaka | F16H 57/033 475/149 |
| 10,161,480 B2 * | 12/2018 | Hsieh | F16H 1/32 |
| 10,281,007 B2 * | 5/2019 | Sugishita | F16H 1/32 |

FOREIGN PATENT DOCUMENTS

| | | | | |
|---|---|---|---|---|
| DE | 102011109191 A1 | | 2/2012 | |
| DE | 102015222809 A1 | * | 5/2016 | ............... F16H 1/32 |
| EP | 2169263 A1 | * | 3/2010 | ............... F16H 1/32 |
| JP | 5-180278 A | | 7/1993 | |
| JP | 2011038582 A | * | 2/2011 | |
| JP | 2014-119101 A | | 6/2014 | |
| JP | 2016-130536 A | | 7/2016 | |
| JP | 2016130536 A | * | 7/2016 | ............... F16H 1/32 |

OTHER PUBLICATIONS

Extended European Search Report dated Sep. 29, 2020 issued in corresponding European Patent Application Mo. 20183443.9.

* cited by examiner

*Primary Examiner* — Sherry L Estremsky (74) *Attorney, Agent, or Firm* — Pillsbury Winthrop Shaw Pittman, LLP (57) ABSTRACT

A speed reducer according to one embodiment of the invention includes a carrier having a recess therein, a crankshaft disposed in the recess, and a stopper that is disposed on a bottom surface of the recess and prevents the crankshaft from moving in a direction along a rotation axis of the crankshaft toward the bottom surface.

15 Claims, 4 Drawing Sheets

SPEED REDUCER

CROSS-REFERENCE TO RELATED APPLICATIONS

This application is based on and claims the benefit of priority from Japanese Patent Application Serial No. 2019-127614 (filed on Jul. 9, 2019), the contents of which are hereby incorporated by reference in its entirety.

TECHNICAL FIELD

The present invention relates to a speed reducer.

BACKGROUND

A speed reducer has been used in industrial robots, machine tools, and various other types of machines that are moved by torque input. The speed reducer decelerates rotation inputted from a drive source such as an electric motor and outputs the decelerated rotation to a device that is to be driven. An eccentric oscillating speed reducer is known as one type of speed reducers. A conventional eccentric oscillating speed reducer is described in Japanese Patent Application Publication No. Hei 5-180278.

A typical eccentric oscillating speed reducer includes a crankshaft having an eccentric portion, an external gear attached to the crankshaft via the eccentric portion, a case having internal teeth that meshes with the external gear, and a carrier provided rotatably relative to the case. In such an eccentric oscillating speed reducer, rotation of a drive source is transmitted from an input gear to the crankshaft. When the crankshaft rotates, the external gear is pushed and rotated by the eccentric portion, and the carrier is rotated relative to the case by the rotation of the external gear. By this configuration, decelerated rotation is outputted from the carrier or the case to the subject device.

A conventional oscillating speed reducer is provided with a cap fitted to the carrier in order to prohibit the axial movement of the crankshaft, as disclosed in, for example, Japanese Patent Application No. 2016-130536. An outer peripheral surface of the cap has a male thread. An inner peripheral surface of the carrier defines a through hole for accommodating the crankshaft and has a female thread. The cap is attached to the carrier by fastening the cap with the male thread on the inner peripheral surface of the carrier, and the axial movement of the crankshaft is prevented by the screw type cap attached to the carrier.

In a conventional speed reducer in which movement of the crankshaft is prevented by the screw type cap, there is a gap between the male thread on the cap and the female thread on the inner peripheral surface of the carrier, so that sealing for preventing lubricant from intruding inside the reducer may become insufficient. This drawback applies not only to the eccentric oscillating type speed reducer but also to other types of speed reducers having a screw cap.

SUMMARY

An object of the present invention is to overcome or reduce at least a part of the above-described drawbacks of the conventional art. More specifically, one object of the invention is to provide a novel speed reducer having a crankshaft support mechanism with an excellent sealing performance. Other objects of the present invention will be apparent with reference to the entire description in this specification.

A speed reducer according to one aspect of the invention includes a carrier having a recess therein, a crankshaft disposed in the recess, and a stopper disposed on a bottom surface of the recess and preventing the crankshaft from moving in a direction toward the bottom surface along a rotation axis of the crankshaft.

The speed reducer may further include a crankshaft bearing disposed on an inner peripheral surface of the recess at a position apart from the bottom surface in a rotation axis direction of the crankshaft. In the speed reducer, the stopper may prevent the crankshaft bearing from moving in the rotation axis direction toward the bottom surface.

In the speed reducer, the inner peripheral surface may include a support surface supporting the crankshaft bearing and a clearance portion disposed between the support surface and the bottom surface in the rotation axis direction, the clearance portion having a larger diameter than the support surface.

In the speed reducer, the clearance portion may be disposed apart from the bottom surface in the rotation axis direction.

In the speed reducer, the carrier may have a through hole extending in the rotation axis direction. The speed reducer may further include a sealing member provided in the through hole.

In the speed reducer, the outer peripheral surface of the stopper may have a smaller diameter than the crankshaft bearing.

In the speed reducer, the through hole may have a smaller diameter than the outer peripheral surface of the stopper.

In the speed reducer, the carrier may have a second recess. The speed reducer may further include a second stopper disposed on a bottom surface of the second recess, the second stopper preventing the crankshaft from moving toward the bottom surface of the second recess in the rotation axis direction.

In the speed reducer, the crankshaft may include an eccentric portion and a journal. The journal has an end surface facing the bottom surface and the stopper supports the journal at the end surface.

In the speed reducer, the stopper may be provided such that it is non-rotatable around the rotation axis relative to the carrier.

In the speed reducer, the stopper may be provided such that it is rotatable around the rotation axis relative to the carrier.

A speed reducer according to another aspect of the invention includes a case, a carrier having a recess therein, a crankshaft bearing provided on a support surface that is a part of an inner peripheral surface of the recess and disposed apart from a bottom surface of the recess, a crankshaft supported by the crankshaft bearing and rotating one of the carrier and the case relative to the other of the carrier and the case; and a stopper preventing the crankshaft and the crankshaft bearing from moving toward the bottom surface in an axial direction of the crankshaft. The stopper faces a clearance portion that forms a part of the inner peripheral surface and has a diameter larger than the support surface.

According to the aspects of the invention, it is possible to obtain a speed reducer having a crankshaft support mechanism that is excellent in hermeticity.

DESCRIPTION OF THE PREFERRED EMBODIMENTS

The following describes various embodiments of the present invention with reference to the appended drawings. In the drawings, like constituent elements are denoted by like reference numerals throughout. It should be noted that the drawings do not necessarily appear to an accurate scale for the sake of convenience of explanation.

Figure 1:
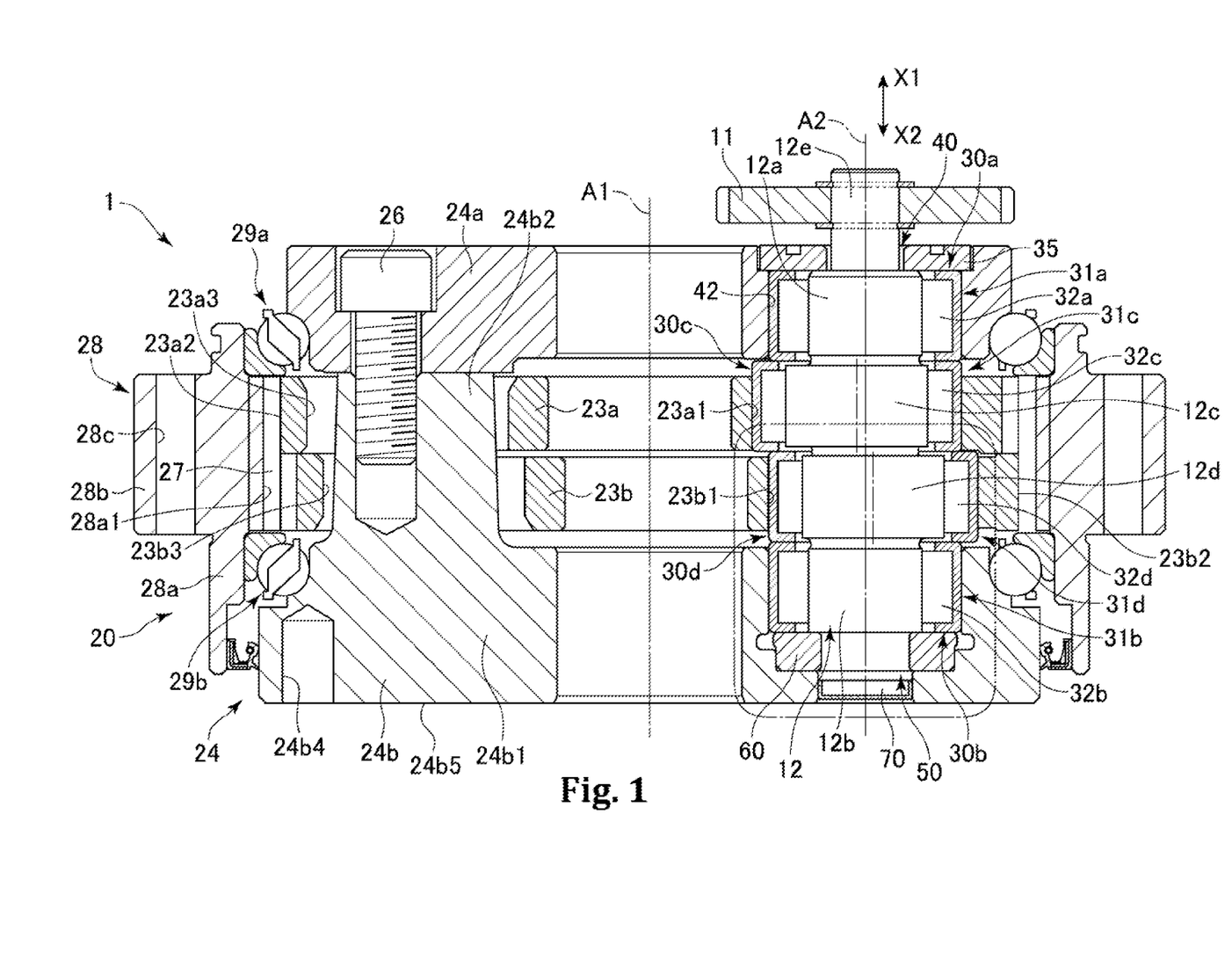
FIG. 1 is a sectional view showing a section of a speed reducer according to one embodiment of the invention along a rotation axis thereof.
Figure 2:
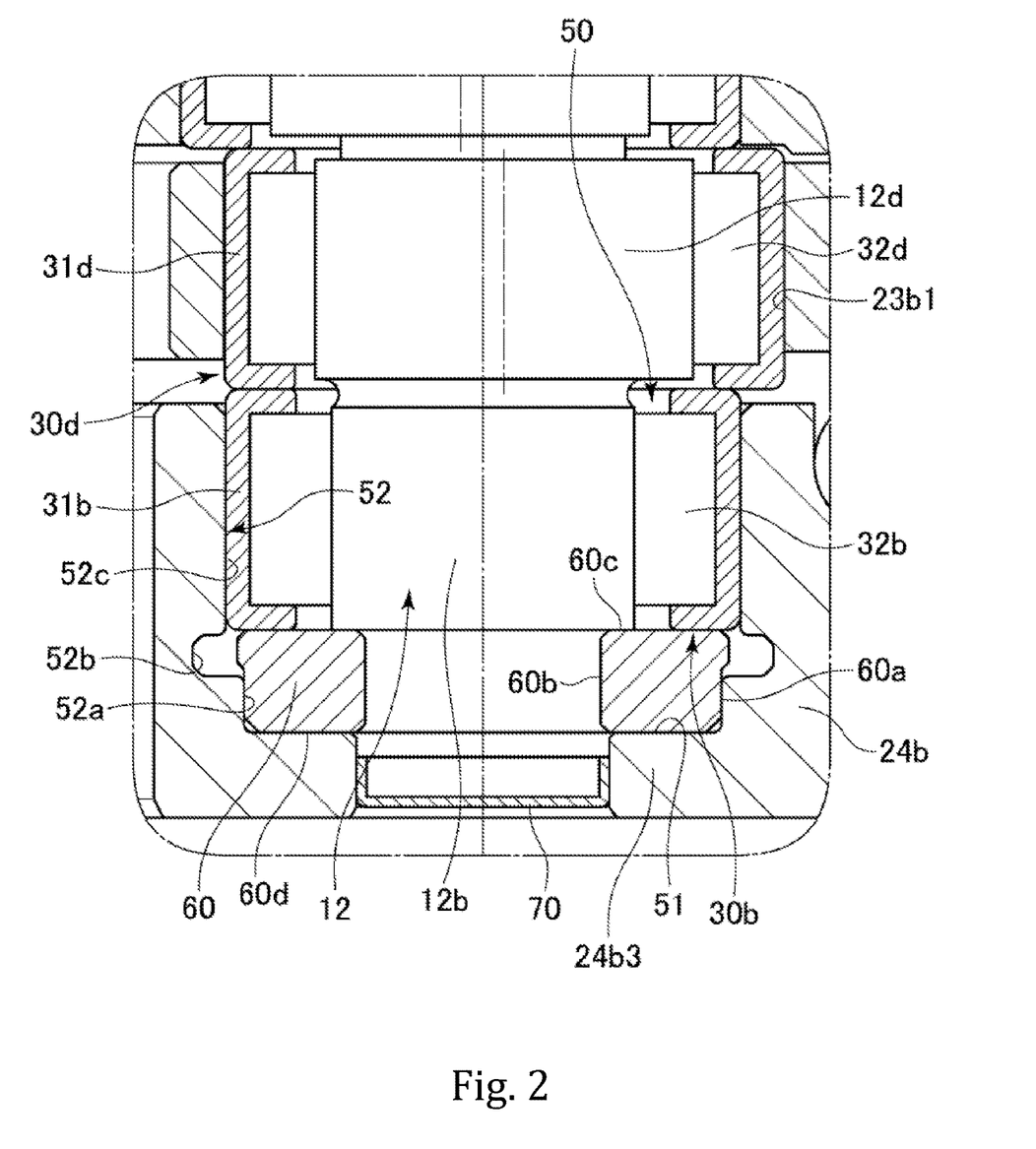
FIG. 2 is an enlarged sectional view showing a crankshaft and a support structure thereof in the speed reducer of FIG. 1.
Figure 3:
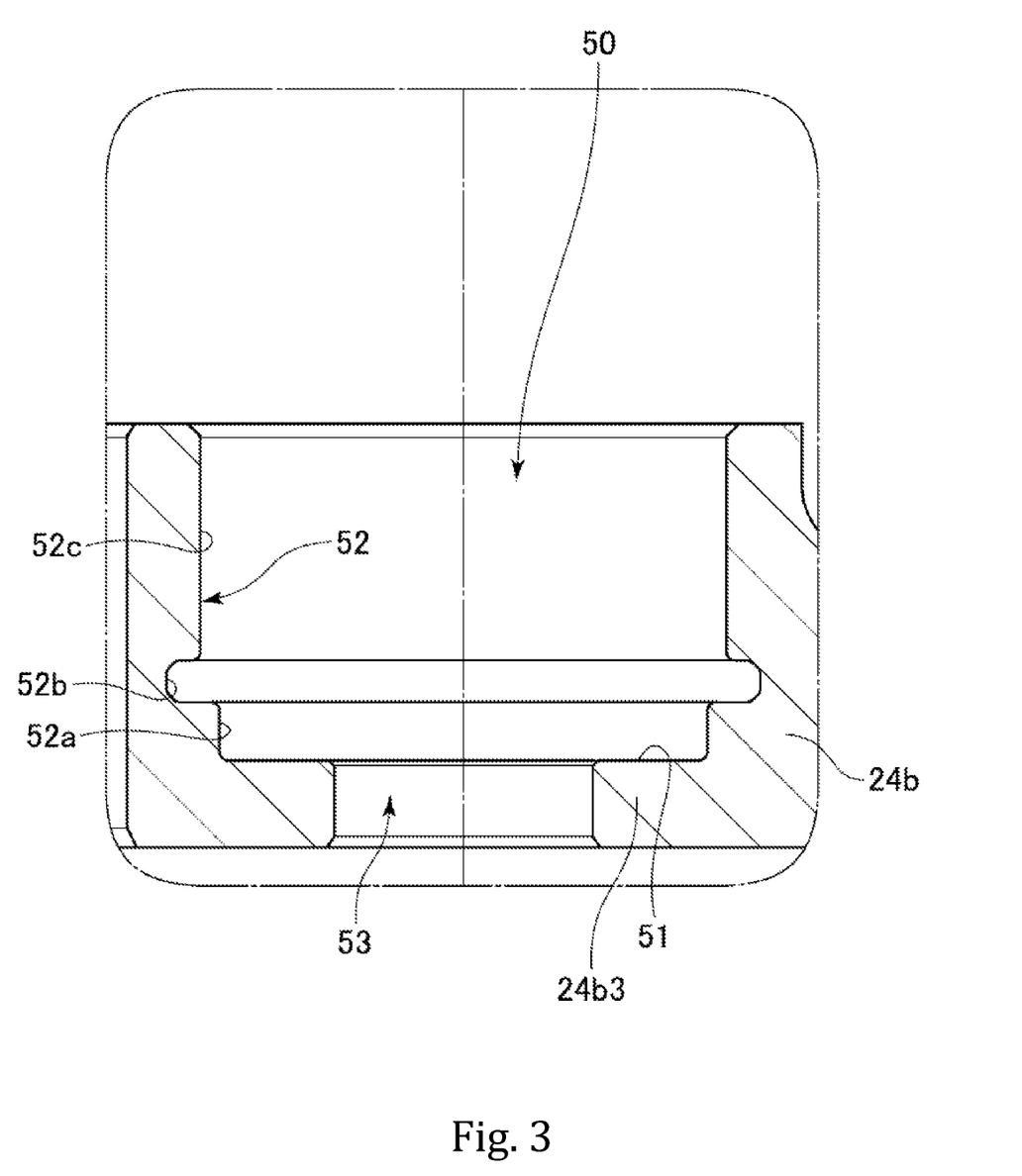
FIG. 3 is an enlarged sectional view of FIG. 2 in which the crankshaft is omitted.

A speed reducer 1 according to one embodiment of the invention will be now described with reference to FIGS. 1 to 3. FIG. 1 is a sectional view showing a section of a speed reducer 1 along a central axis A1 thereof. FIG. 2 is an enlarged sectional view showing a crankshaft and support structure thereof provided in the speed reducer 1. FIG. 3 is a view in which the crankshaft is omitted from FIG. 2, and illustrating a recess for receiving the crankshaft.

These drawings show the speed reducer 1 of an eccentric oscillating type as one type of speed reducer to which the invention is applicable. The speed reducer 1 includes a spur gear 11, a crankshaft 12, and a speed reducing mechanism 20. It will be appreciated by those skilled in the art that the present invention is also applicable to speed reducers other than the eccentric oscillating type.

The spur gear 11 is one example of a rotation transmission mechanism that transmits rotation inputted from an unshown drive source to the crankshaft 12. The spur gear 11 may mesh with an input gear to which rotation from the drive source is input. The rotation transmission mechanism applicable to the speed reducer 1 is not limited to the spur gear 11. As the rotation transmission mechanism for the speed reducer 1, any mechanism capable of transmitting input from the drive source to the crankshaft 12 can be used.

The crankshaft 12 is a substantially columnar member extending along a shaft axis A2. In the illustrated embodiment, the crankshaft 12 is spline-coupled with the spur gear 11. Thus, the rotation input from the drive source is transmitted to the crankshaft 12 via the spur gear 11.

The speed reducing mechanism 20 decelerates rotation inputted from the crankshaft 12 and outputs the decelerated rotation to a subject device to be driven. The decelerated rotation is transmitted to the subject device as rotation about the central axis A1. The speed reducer 1 may be provided in an industrial robot. In this case, the subject device to be driven is, for example, an arm of the industrial robot. The speed reducing mechanism 20 will be described in more detail later.

The crankshaft 12 will now be more specifically described. The crankshaft 12 is a substantially columnar member extending along the shaft axis A2 and rotates (spins) about the shaft axis A2 by input of rotation transmitted from the spur gear 11. The crankshaft 12 includes a first journal portion 12a, a second journal portion 12b, an eccentric portion 12c, an eccentric portion 12d, and a head 12e. The first journal portion 12a, the second journal portion 12b, the eccentric portion 12c, the eccentric portion 12d, and the head 12e may be formed integrally. In other words, the first journal portion 12a, the second journal portion 12b, the eccentric portion 12c, the eccentric portion 12d, and the head 12e may form a single unit in which no relative movement among them occurs in a circumferential direction around the shaft axis A2.

Each of the first journal portion 12a and the second journal portion 12b has a columnar shape extending in the shaft axis A2 direction. In the shaft axis A2 direction, the eccentric portion 12c is provided on an X2 side with respect to the first journal portion 12a. In the shaft axis A2 direction, the eccentric portion 12d is provided on the X2 side with respect to the eccentric portion 12c. In one embodiment, the eccentric portion 12c and the eccentric portion 12d have a cylindrical shape(s). As viewed from the shaft axis A2 direction, the eccentric portion 12c and the eccentric portion 12d are formed in a circular shape having a center at a position radially displaced from the shaft axis A2. That is, the eccentric portion 12c and the eccentric portion 12d are eccentric with respect to the shaft axis A2. The eccentric portion 12c and the eccentric portion 12d are different in phase from each other. For example, a phase difference between the eccentric portion 12c and the eccentric portion 12d is 180°.

In the shaft axis A2 direction, the head 12e is disposed on an X1 side with respect to the first journal portion 12a. That is, the head 12e is disposed on an opposite side to the eccentric portion 12c with respect to the first journal portion 12a. The head 12e has a substantially columnar shape. The head 12e is spline-coupled to the spur gear 11.

Next, the speed reducing mechanism 20 will now be more specifically described. In the illustrated embodiment, the speed reducing mechanism 20 includes external gears 23a and 23b, a carrier 24, and a case 28. In the speed reducing mechanism 20, the carrier 24 rotates relative to the case 28 around the central axis A1 by the rotation input from the crankshaft 12. The rotation decelerated by the speed reducing mechanism 20 is transmitted from the carrier 24 or the case 28 to the subject device to be driven. Since the carrier 24 or the case 28 rotates around the central axis A1, the central axis A1 may be also referred to as a rotation axis of the speed reducer 1.

The external gear 23a and the external gear 23b both have a substantially ring shape. The external gear 23a and the external gear 23b each have at its center a through hole extending along the central axis A1. For example, a cable is accommodated in the through hole extending along the central axis A1.

The external gear 23a further has a crank through hole 23a1, and the external gear 23b has a crank through hole 23b1. For simplicity of description, the crank through hole 23a1 will be hereunder simply referred to as a through hole 23a1 and the crank through hole 23b1 will be simply referred to as a through hole 23b1. The through hole 23a1 is a through hole penetrating the external gear 23a in the axial direction along the central axis A1 at a position shifted radially outward from the central axis A1. The through hole 23b1 is a through hole penetrating the external gear 23b in the axial direction along the central axis A1 at a position shifted radially outward from the central axis A1. The external gear 23a may have two or more through holes 23a1 arranged along the circumferential direction around the central axis A1. The external gear 23b may have two or more through holes 23b1 arranged along the circumferential direction around the central axis A1.

The crankshaft 12 is disposed in the through hole 23a1 and the through hole 23b1. The through hole 23a1 and the through hole 23b1 house the crankshaft 12 partially. In the illustrated embodiment, the crankshaft 12 is disposed such that the eccentric portion 12c is situated within the through hole 23a1 and the eccentric portion 12d is situated within the through hole 23b1.

The external gears 23a and 23b each have a through hole for receiving a boss 24b2 of the second carrier member 24b, which will be later described. Specifically, the external gear 23a has a through hole 23a3 on a radially outer side of the central axis A1, and the external gear 23b has a through hole 23b3 on a radially outer side of the central axis A1. The though hole 23a3 and the through hole 23b3 are provided at positions opposed to each other. Although FIG. 1 shows a single through hole 23a3 and a single through hole 23b3, the external gear 23a may have a plurality of through holes 23a3, and the external gear 23b may have a plurality of through holes 23b3.

The external gear 23a and the external gear 23b both have external teeth. Specifically, the external gear 23a has external teeth 23a2, and the external gear 23b has external teeth 23b2. The external gear 23a and the external teeth 23b2 are in the shape of, for example, a pericycloid. Any number of external gears may be provided in the speed reducer 1. The illustrated speed reducer 1 has two external gears (that is, the external gear 23a and the external gear 23b), however the speed reducer 1 may have only one external gear or three or more external gears.

The case 28 is provided on a radially outer side of the external gear 23a and the external gear 23b. The case 28 includes a case body 28a having a hollow cylindrical shape and a flange 28b provided on a radially outer side of the case body 28a. The flange 28b has a bolt hole 28c extending parallel to the central axis A1. For example, a part of a subject device to be driven (not shown) is coupled to the flange 28b. The subject device to be driven is, for example, an industrial robot. When the subject device to be driven is an industrial robot, an arm or base of the industrial robot is coupled to the flange 28b. The subject device to be driven can be coupled to the flange 28b by using a bolt. The base of the industrial robot is used to secure the industrial robot on a surface such as a floor at an installation location of the industrial robot. When the flange 28b is coupled to the base of the industrial robot, rotation of the flange 28b (and thus the case 28) is prevented.

On an inner peripheral surface of the case body 28a, a plurality of grooves 28a1 is formed to extend along the central axis A1. In other words, the case body 28a has the plurality of grooves 28a1 extending along the central axis A1. Pins 27 are provided in the plurality of grooves 28a1, respectively. The number of the pins 27 is different from the number of teeth of each of the external gears 23a and 23b. The number of the pins 27 is, for example, one more than the number of teeth of the external gears 23a and 23b. The pins 27 are an example of internal teeth that mesh with the external teeth 23a2 of the external gear 23a and the external teeth 23b2 of the external gear 23b.

The carrier 24 is provided on a radially inner side of the case 28. The carrier 24 is provided such that it is rotatable around the central axis A1 relative to the case 28. The carrier 24 includes a first carrier member 31 and a second carrier member 24. The first carrier member 24a is disposed on the X1 side of the second carrier member 24b in the axial direction along the central axis A1. A gap is provided between the first carrier member 24a and the second carrier member 24b. The external gear 23a and the external gear 23b are disposed in the gap between the first carrier member 24a and the second carrier member 24b.

The first carrier member 24a has a substantially disc shape. The second carrier member 24b includes a substantially disc-shaped base 24b1 and the boss 24b2 protruding in the X1 direction on the radially outer side of the center axis A1. The boss 24b2 has a bolt hole for receiving the bolt 26. The first carrier member 24a and the second carrier member 24b are connected by a bolt 26. The second carrier member 24b has two end surfaces that intersect the axial direction. Of the two end surfaces of the second carrier member 24b, the end surface on the side opposite to the first carrier member 24a (that is, the end surface on the X2 side) is referred to as an attachment surface 24b5. The subject device to be driven is attached to the speed reducer 1 on the attachment surface 24b5. The second carrier member 24b has a recess 24b4 in the attachment surface 24b5. The recess 24b4 extends in the X1 direction from the attachment surface 24b5. The recess 24b4 is used to couple the subject device to be driven to the second carrier member 24b. The subject device to be driven can be coupled to the carrier member 24b by inserting a bolt (not shown) into the recess 24b4. The second carrier member 24b preferably has more than one recess 24b4. By fastening the subject device to the attachment surface 24b5 through the plurality of recesses 24b4, the subject device is securely fastened to the second carrier member 24b with a strong fastening force. As described above, the subject device to be driven may be an industrial robot. When the industrial robot arm is coupled to the flange 28b, the industrial robot base is coupled to the carrier member 24b. Whereas when the industrial robot base is coupled to the flange 28b, the industrial robot arm is coupled to the carrier member 24b. When the carrier member 24b is coupled to the base of the industrial robot, rotation of the carrier member 24b (and thus the carrier 24) is prevented.

The first carrier member 24a is supported by the case 28 via a main bearing 29a. The second carrier member 24b is supported by the case 28 via a main bearing 29b. In this manner, the first carrier member 24a and the second carrier member 24b are disposed rotatably relative to the case 28. The first carrier member 24a and the second carrier member 24b are coupled by using the bolt 26, and thus the first carrier member 24a and the second carrier member 24b integrally rotate relative to the case 28.

The first carrier member 24a has a through hole 40 that receives the crankshaft 12. The through hole 40 in the first carrier member 24a is defined by an inner peripheral surface 42 around the shaft axis A2. The inner peripheral surface 42 extends along the circumferential direction around the shaft axis A2. The first journal portion 12a of the crankshaft 12 is received in the through hole 40. A crankshaft bearing 30a is provided between the first journal portion 12a and the inner peripheral surface 42. The first journal portion 12a of the crankshaft 12 is supported by the first carrier member 24a via the crankshaft bearing 30a.

The through hole 40 is provided with a cap 35 that prevents the crankshaft 12 from moving in the X1 direction along the shaft axis A2. The cap 35 has a disc shape. The cap 35 has a through hole extending along the shaft axis A2 at a radially central portion thereof. The head 12e of the crankshaft 12 is inserted into this through hole. A male thread is provided on an outer peripheral surface of the cap 35, and a female thread is provided on a part of the inner peripheral surface 42 that defines the through hole 40. The male thread of the cap 35 is engaged with the female thread on the inner peripheral surface 42 thereby the cap 35 is attached to the first carrier member 24a. A lower surface of the cap 35 attached to the first carrier member 24a contacts an end surface of the first journal portion 12a facing the X1 direction. In this way, the cap 35 attached to the first carrier member 24a prevents the first journal portion 12a from moving in the X1 direction.

The second carrier member 24b has a recess 50 that receives the crankshaft 12. The recess 50 extends in the X2 direction from the end surface of the second carrier member 24b facing the X1 direction. The recess 50 is defined by a bottom surface 51 and an inner peripheral surface 52, as is clearly shown in FIG. 3 in which illustration of the crankshaft 12 is omitted. The bottom surface 51 extends in a direction intersecting with the shaft axis A2. The bottom surface 51 may be provided so as to be orthogonal to the shaft axis A2.

The inner peripheral surface 52 extends along the circumferential direction around the shaft axis A2. The inner peripheral surface 52 includes a first surface 52a connected to the bottom surface 51, a second surface 52b situated on the X1 side of the first surface 52a, and a third surface 52c situated on the X1 side of the second surface 52b. The second surface 52b has a larger dimension than the first surface 52a and the third surface 52c in the radial direction around the shaft axis A2. Thus, the second surface 52b is recessed in the direction away from the shaft axis A2 compared to the first surface 52a and the third surface 52c. The third surface 52c is disposed apart from the bottom surface 51 in the axial direction along the shaft axis A2. The shape of the recess 50 applicable to the invention is not limited to the illustrated one. For example, the inner peripheral surface 52 may include any surface other than the first surface 52a, the second surface 52b, and the third surface 52c.

The second carrier member 24b has a support portion 24b3 protruding from the first surface 52a toward the shaft axis A2. Of the surfaces defining the profile of the support portion 24b3, the surface facing the recess 50 defines at least a part of the bottom surface 51. The support portion 24b3 has a through hole 53 extending in the axial direction along the shaft axis A2. The through hole 53 may be provided coaxially with the shaft axis A2. The through hole 53 may have a circular shape when viewed from the direction of the shaft axis A2. In one embodiment, the radial dimension of the through hole 53 is smaller than the radial dimension of a stopper 60. That is, the through hole 53 has a smaller diameter than an outer peripheral surface 60a of the stopper 60.

A sealing member 70 is provided in the through hole 53. The sealing member 70 can seal off lubricant inside the speed reducer 1. As the sealing member 70, a synthetic resin seal cap may be used.

The second journal portion 12b of the crankshaft 12 and the stopper 60 are received in the recess 50 of the second carrier member 24b. The crankshaft 12 is disposed in the recess 50 such that the second journal portion 12b faces the third surface 52c of the inner peripheral surface 52 in the radial direction. The third surface 52c has a circular shape when viewed from the direction of the shaft axis A2. A crankshaft bearing 30b is provided between the second journal portion 12b and the third surface 52c of the inner peripheral surface 52. The crankshaft bearing 30b is supported by the third surface 52c of the inner peripheral surface 52. Therefore the third surface 52c may be hereunder referred to as a support surface. As described above, the second journal portion 12b of the crankshaft 12 is supported by the second carrier member 24b via the crankshaft bearing 30b.

The recess 50 may be formed by cutting work. When the recess 50 is formed by cutting, the second surface 52b serves as a clearance portion for a cutting tool during cutting process. Since there is the second surface 52b that provides the clearance portion for cutting, the third surface 52c can be machined so as to have the uniform diameter from the end on the X1 side to the end on the X2 side in the axial direction along the shaft axis A2. When there is no second surface 52b that provides a clearance portion, a cutting tool cannot reach the X2 side end of the third surface 52c, and therefore the X2 side end of the third surface 52c ends up being curved toward the shaft axis A2. If the crankshaft bearing 30b is attached in the recess having the curved portion, the crankshaft bearing 30b interferes with the curved portion so that the crankshaft bearing 30b cannot be accurately attached in the recess 50. In one embodiment, by providing the second surface 52b that serves as the clearance, the third surface 52c can be formed to have the uniform diameter up to the end on the X2 side in the axial direction along the axial center A2, which improves the attachment accuracy of the crankshaft bearing 30b.

The stopper 60 is provided on the bottom surface 51 of the recess 50. The stopper 60 has, for example, a ring shape. In one embodiment, the stopper 60 is made of a material having a high hardness such as stainless steel. The stopper 60 includes an outer peripheral surface 60a, an inner peripheral surface 60b, a first end surface 60c connecting the outer peripheral surface 60a and the inner peripheral surface 60b, and a second end surface 60d connecting the outer peripheral surface 60a and the inner peripheral surface 60b. The profile of the stopper 60 is defined by the outer peripheral surface 60a, the inner peripheral surface 60b, the first end surface 60c, and the second end surface 60d. The second end surface 60d is on the X2 side of the first end surface 60c. The second end surface 60d of the stopper 60 contacts the bottom surface 51 of the recess 50. The second carrier member 24b supports the stopper 60 by the bottom surface 51 (that is, by the support portion 24b3). The stopper 60 is supported by the bottom surface 51 so that it is prevented from moving in the X2 direction in the axial direction.

In the recess 50, the first end surface 60c of the stopper 60 contacts the second journal portion 12b of the crankshaft 12. The stopper 60 prevents the crankshaft 12 from moving in the axial direction toward the bottom surface 51 (that is, the X2 direction) by supporting the second journal portion 12b by the first end surface 60c.

In one embodiment, the first end surface 60c of the stopper 60 also contacts the crankshaft bearing 30b. The stopper 60 prevents the crankshaft bearing 30b from moving in the axial direction toward the bottom surface 51 (that is, the X2 direction) by supporting the crankshaft bearing 30b by the first end surface 60c.

In the illustrated embodiment, the outer peripheral surface 60a of the stopper 60 has a smaller diameter than the outer peripheral surface of the crankshaft bearing 30b. That is, the radial dimension of the outer peripheral surface 60a of the stopper 60 is smaller than the radial dimension of an outer peripheral surface of a retainer 31b of the crankshaft bearing 30b.

In one embodiment, the stopper 60 is disposed in the recess 50 rotatably around the shaft axis A2 relative to the second carrier member 24b. For example, the recess 50 is provided such that the first surface 52a has a circular shape when viewed from the shaft axis A2 direction. The stopper 60 is provided such that the outer peripheral surface 60a has a circular shape concentric with the first surface 52a. Thus, when the crankshaft 12 rotates about the shaft axis A2, a force exerted by the crankshaft 12 in the circumferential direction of the shaft axis A2 causes the stopper 60 to rotate around the shaft axis A2 in the same direction as the crankshaft 12. In another embodiment, the stopper 60 may be provided non-rotatably around the shaft axis A2 relative to the second carrier member 24b. For example, the recess 50 is provided such that the first surface 52a has a polygonal shape (for example, a hexagonal shape) when viewed from the direction of the shaft axis A2, and the stopper 60 has the outer peripheral surface 60a that has a polygonal shape (for example, a hexagonal shape) corresponding to the first surface 52a when viewed from the direction of the shaft axis A2. Thus, even when the crankshaft 12 rotates about the shaft axis A2 and a force by the crankshaft 12 in the circumferential direction of the shaft axis A2 exerts on the stopper 60, the stopper 60 does not rotate around the shaft axis A2.

A crankshaft bearing 30c is provided between the eccentric portion 12c and the through hole 23a1, and a crankshaft bearing 30d is provided between the eccentric portion 12d and the through hole 23b1. In this configuration, the external gear 23a is supported by the eccentric portion 12c of the crankshaft 12 via the crankshaft bearing 30c, and the external gear 23b is supported by the eccentric portion 12d of the crankshaft 12 via the crankshaft bearing 30d.

In the illustrated embodiment, crankshaft bearings 30a to 30d are all needle bearings. However, the crankshaft bearing 30c and the crankshaft bearing 30d may be bearings of a type other than the needle bearing. The crankshaft bearing 30a includes a retainer 31a and a rolling element 32a retained by the retainer 31a. The crankshaft bearing 30b includes a retainer 31b and a rolling element 32b retained by the retainer 31b. The crankshaft bearing 30c includes a retainer 31c and a rolling element 32c retained by the retainer 31c. The crankshaft bearing 30d includes a retainer 31d and a rolling element 32d retained by the retainer 31d.

The shapes, structures, and arrangements of the components of the speed reducer 1 are not limited to those explicitly shown in the specification and the accompanying drawings. In particular, the shape, structure, and arrangement of the stopper 60 is not limited to the illustrated embodiments and those explicitly described herein. At least one of the crankshaft bearings 30a to 30d may be any type of bearing capable of supporting the crankshaft 12 other than the needle bearing. The shapes, structures, and arrangement of the carrier 24 and the case 28 are not limited to the illustrated embodiments and those explicitly described herein.

Subsequently, an operation of the speed reducer 1 will be described. When the spur gear 11 is rotated by a rotational drive force from the drive source, the rotation is transmitted to the crankshaft 12 through the head 12e that directly meshes with the spur gear 11. The rotation inputted from the drive source causes the eccentric portion 12c and the eccentric portion 12d of the crankshaft 12 to rotate eccentrically about the shaft axis A2. By the rotation of the crankshaft 12, the eccentric portion 12c and the eccentric portion 12d push the external gears 23a and 23b respectively in the circumferential direction. Thus a single rotation of the crankshaft 12 causes the external gears 23a and 23b to rotate relative to the case 28 by a difference between the number of pins 27 of the case 28 and the number of teeth of the external gears 23a and 23b. In this manner, rotation of the crankshaft 12 is reduced at a reduction ratio (the number of teeth of the external gears 23a, 23b)/(the number of the pins 27—the number of teeth of the external gears 23a, 23b). The decelerated rotation is transmitted to the carrier 24 or the case 28. When rotation of the carrier 24 is prevented, the case 28 rotates around the central axis A1 by one tooth, which is a difference between the number of the pins 27 and the number of teeth of the external gears 23a, 23b. When rotation of the case 28 is prevented, the carrier 24 rotates around the central axis A1.

As described above, the rotation input from the drive source is decelerated by the reduction ratio in the reduction mechanism 20 and the decelerated rotation is output from the carrier 24 or the case 28 to the subject device.

Figure 4:
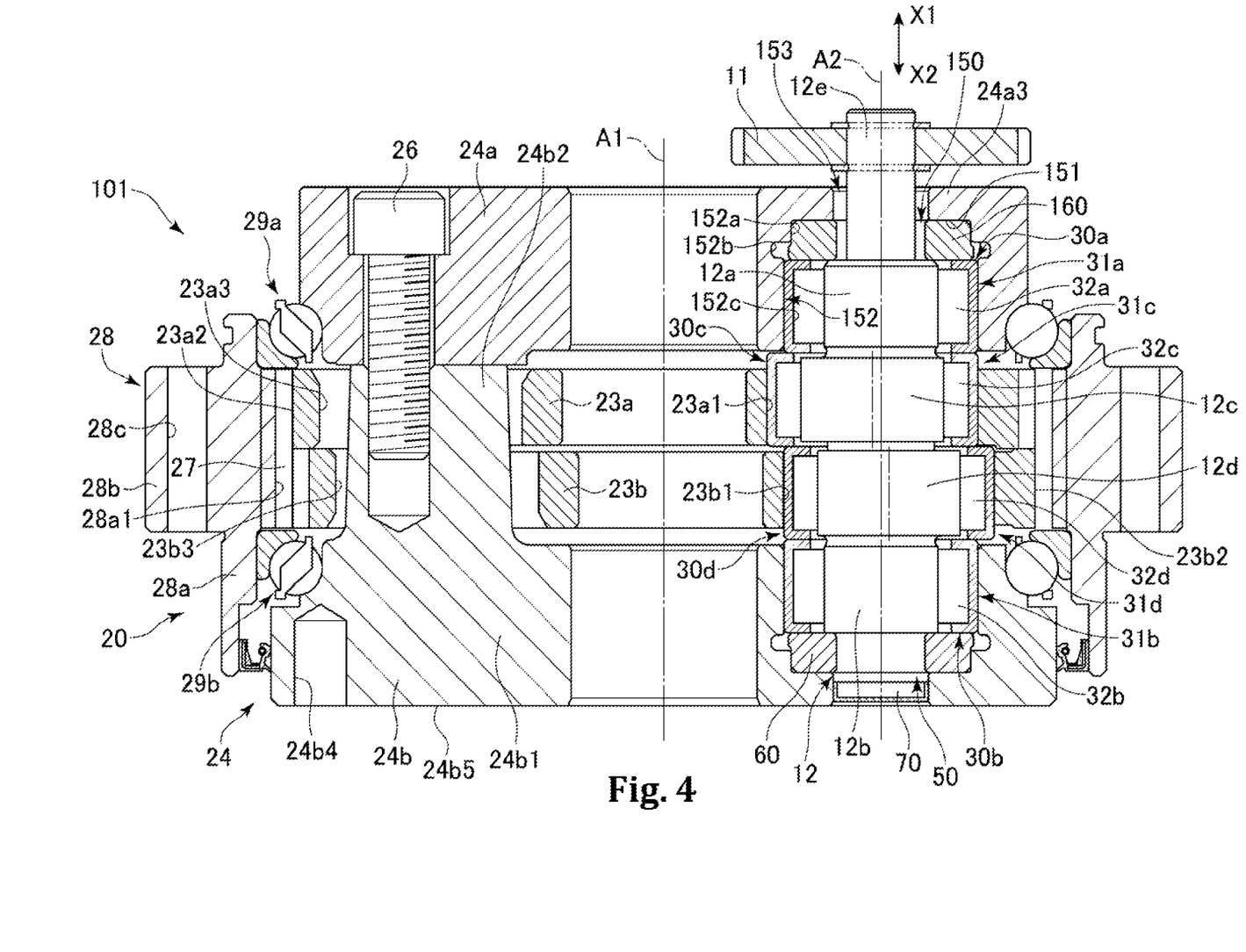
FIG. 4 is a sectional view showing a section of a speed reducer according to another embodiment of the invention along a rotation axis thereof.

Next, a speed reducer 101 according to another embodiment of the invention will be described with reference to FIG. 4. The speed reducer 101 according to this embodiment is different from the speed reducer 1 in that a recess 150 is provided in the first carrier member 24a, and a stopper 160 that prevents the crankshaft 12 from moving in the X1 direction is provided in the recess 150. That is, in the speed reducer 1, the movement of the crankshaft 12 in the X1 direction is prevented by the cap 35, whereas in the speed reducer 101, the movement of the crankshaft 12 in the X1 direction is prevented by the stopper 160. Components of the speed reducer 101 shown in FIG. 4 that are the same or similar to the components of the speed reducer 1 shown in FIG. 1 are given the same or similar reference numerals as ones used in FIG. 1, and detailed descriptions thereof will not be repeated.

The first carrier member 24a has the recess 150 that receives the crankshaft 12. The recess 150 extends in the X1 direction from the end surface of the first carrier member 24a facing the X2 direction. The recess 150 is defined by a bottom surface 151 and an inner peripheral surface 152. The bottom surface 151 extends in a direction intersecting with the shaft axis A2. The bottom surface 151 may be provided so as to be orthogonal to the shaft axis A2. The inner peripheral surface 152 extends along the circumferential direction around the shaft axis A2. The inner peripheral surface 152 includes a first surface 152a connected to the bottom surface 151, a second surface 152b situated on the X2 side of the first surface 152a, and a third surface 152c situated on the X2 side of the second surface 152b. The second surface 52b has a larger dimension than the first surface 52a and the third surface 52c in the radial direction around the shaft axis A2. The third surface 52c is disposed apart from the bottom surface 151 in the axial direction along the shaft axis A2. The recess 150 may have the same or substantially the same shape as the recess 50.

The first carrier member 24a has a support portion 24a3 protruding from the first surface 152a toward the shaft axis A2. The support portion 24a3 has a through hole 153 extending in the axial direction along the shaft axis A2. The through hole 153 may be provided coaxially with the shaft axis A2. The through hole 153 may have a circular shape when viewed from the direction of the shaft axis A2. In one embodiment, the radial dimension of the through hole 153 is smaller than the radial dimension of the stopper 160. That is, the through hole 153 has a smaller diameter than an outer peripheral surface of the stopper 160.

The second journal portion 12a of the crankshaft 12 and the stopper 160 are received in the recess 150 of the first carrier member 24a. The crankshaft 12 is disposed in the recess 150 such that the first journal portion 12a faces the third surface 152c of the inner peripheral surface 152 in the radial direction. The third surface 152c has a circular shape when viewed from the direction of the shaft axis A2. The crankshaft bearing 30a is provided between the first journal portion 12a and the third surface 152c of the inner peripheral surface 152. The crankshaft bearing 30b is supported by the third surface 152c of the inner peripheral surface 152. In this manner, the first journal portion 12a of the crankshaft 12 is supported by the first carrier member 24a via the crankshaft bearing 30a.

Similarly to the recess 50, the recess 150 may be formed by cutting work. When the recess 150 is formed by cutting, the second surface 152b serves as a clearance portion in which a cutting tool can recede during cutting. Accordingly, the third surface 152c can be machined to have the uniform diameter from the end on the X1 side to the end on the X2 side in the axial direction along the shaft axis A2. As a result, the crankshaft bearing 30a can be accurately attached to the recess 150.

The stopper 160 is provided on the bottom surface 151 of the recess 150. The stopper 160 is a ring-shaped member. The stopper 160 may have the same or substantially the same shape as the stopper 60. One end surface of the stopper 160 contacts the bottom surface 151 of the recess 150. The bottom surface 151 of the first carrier member 24a supports the stopper 160. The stopper 160 is supported by the bottom surface 151 so that it is prevented from moving in the X1 direction in the axial direction. One end surface of the stopper 160 contacts the first journal portion 12a of the shaft 12. The stopper 160 prevents the crankshaft 12 from moving in the axial direction toward the bottom surface 151 (that is, the X1 direction) by supporting the first journal portion 12a by the end surface facing the X2 direction. In one embodiment, the end surface of the stopper 160 also contacts the crankshaft bearing 30a. The stopper 160 prevents the crankshaft bearing 30a from moving in the axial direction toward the bottom surface 151 (that is, the X1 direction) by supporting the crankshaft bearing 30a at the end surface.

In the illustrated embodiment, the outer peripheral surface of the stopper 160 has a smaller diameter than the crankshaft bearing 30a. That is, the radial dimension of the outer peripheral surface of the stopper 160 is smaller than the radial dimension of an outer peripheral surface of the retainer 31a of the crankshaft bearing 30a.

In one embodiment, the stopper 160 is disposed in the recess 150 rotatably around the shaft axis A2 relative to the first carrier member 24a. In another embodiment, the stopper 160 is provided non-rotatably around the shaft axis A2 relative to the first carrier member 24a.

Advantageous effects of the foregoing embodiments will be now described. According to the above-described embodiment, the movement of the crankshaft 12 in one direction (X2 direction) along the shaft axis A2 is prevented by the stopper 60 provided on the bottom surface 51 of the recess 50 in the second carrier member 24b. Since the stopper 60 is prevented from moving in the axial direction relative to the second carrier member 24b by the bottom surface 51 (that is, the support portion 24b3), it is not necessary to provide a male thread on the outer peripheral surface 60a of the stopper 60 for attaching the stopper 60 to the second carrier member 24b. Therefore, the speed reducer 1 according to the embodiment can achieve higher hermeticity as compared with conventional speed reducers in which the crankshaft 12 is supported by the screw cap.

According to the above embodiment, the stopper 60 is disposed such that it contacts with the crankshaft bearing 30b. Therefore, the stopper 60 is able to prevent the crankshaft bearing 30b from moving in one direction (X2 direction) along the shaft axis A2. According to the above-described embodiment, the stopper 60 supports the end surface of the second journal portion 12b of the crankshaft 12 facing the X2 direction. In this manner, the stopper 60 is able to prevent the crankshaft 12 from moving in one direction (X2 direction) along the shaft axis A2.

According to the above-described embodiment, the inner peripheral surface 52 of the recess 50 has the second surface 52b (clearance portion) that is disposed between the first surface 52a and the third surface 52c and has a larger diameter than the first surface 52a and the third surface 52c. The second surface 52b that serves as a clearance portion for a cutting tool during cutting is provided between the first surface 52a and the third surface 52c. Therefore the third surface 52c can be machined to have the uniform diameter from the end on the X1 side to the end on the X2 side in the axial direction along the shaft axis A2. Thereby, the attachment accuracy of the crankshaft bearing 30b can be improved.

According to the above-described embodiment, the support portion 24b3 of the second carrier member 24b has the through hole 53, and the sealing member 70 is provided in the through hole 53. The sealing member 70 can seal off the lubricant inside the speed reducer 1.

In the illustrated embodiment, the outer peripheral surface 60a of the stopper 60 has a smaller diameter than the crankshaft bearing 30b. The screw-type cap in the conventional speed reducer prevents the movement of the crankshaft bearing in the axial direction, and the male thread formed on the outer peripheral surface meshes with the female screw formed on the inner peripheral surface of the carrier. Thus the outer diameter of the screw-type cap is larger than that of the crankshaft bearing. Whereas, according to the embodiment of the invention, the movement of the stopper 60 in the axial direction is prevented by the support portion 24b3 of the second carrier member 24b so that the outer peripheral surface 60a of the stopper can be made smaller in diameter than the crankshaft bearing 30b. As a result, the size of the stopper 60 in the radial direction can be reduced.

According to the above-described embodiment, the through hole 53 in the support portion 24b3 of the second carrier member 24b has a smaller diameter than the outer peripheral surface 60a of the stopper 60. As a result, the through hole 53 in the second carrier member 24b facing the crankshaft 12 can have a small diameter. Therefore, it is possible to secure a wide area for providing the recess 24b4 in the attachment surface 24b5 of the second carrier member 24b. This allows the subject device to be more reliably attached to the attachment surface 24b5 of the second carrier member 24b.

According to one embodiment described above, the stopper 160 provided on the bottom surface 151 of the recess 150 in the second carrier member 24b prevents the crankshaft 12 from moving toward the other side in the axial direction. Thereby, the hermeticity of the speed reducer can be further enhanced.

The dimensions, materials, and arrangements of the constituent elements described herein are not limited to those explicitly described for the embodiments, and these constituent elements can be modified to have any dimensions, materials, and arrangements within the scope of the present invention. Furthermore, constituent elements not explicitly described herein can also be added to the described embodiments, and it is also possible to omit some of the constituent elements described for the embodiments.

Any combination of the above-described embodiments may be possible as appropriate. The invention may encompass aspects realized by combining two or more embodiments.

What is claimed is:
1. A speed reducer, comprising:
a carrier having a recess therein;

a crankshaft disposed in the recess; and a stopper disposed on a bottom surface of the recess, the stopper being in contact with the crankshaft and preventing the crankshaft from moving in a direction toward the bottom surface along a rotation axis of the crankshaft.

2. The speed reducer of claim 1, further comprising a crankshaft bearing disposed on an inner peripheral surface of the recess at a position apart from the bottom surface in a rotation axis direction of the crankshaft, wherein the stopper prevents the crankshaft bearing from moving in the rotation axis direction toward the bottom surface.

3. The speed reducer of claim 2, wherein the inner peripheral surface includes a support surface supporting the crankshaft bearing and a clearance portion disposed between the support surface and the bottom surface in the rotation axis direction, the clearance portion having a larger diameter than the support surface.

4. The speed reducer of claim 3, wherein the clearance portion is disposed apart from the bottom surface in the rotation axis direction.

5. The speed reducer of claim 4, wherein the carrier has a through hole extending in the rotation axis direction, and wherein the speed reducer further comprises a sealing member provided in the through hole.

6. The speed reducer of claim 5, wherein an outer peripheral surface of the stopper has a smaller diameter than the crankshaft bearing.

7. The speed reducer of claim 6, wherein the through hole has a smaller diameter than the outer peripheral surface of the stopper.

8. The speed reducer of claim 2, wherein the inner peripheral surface includes a support surface supporting the crankshaft bearing, a first surface extending from the bottom surface of the recess, and a clearance portion disposed between the support surface and the first surface in the rotation axis direction, the clearance portion having a larger diameter than the support surface.

9. The speed reducer of claim 1, wherein the carrier has a second recess, and wherein the speed reducer further comprises a second stopper disposed on a bottom surface of the second recess, the second stopper preventing the crankshaft from moving toward the bottom surface of the second recess in the rotation axis direction.

10. The speed reducer of claim 1, wherein the crankshaft includes an eccentric portion and a journal, the journal having an end surface facing the bottom surface, and wherein the stopper supports the journal at the end surface.

11. The speed reducer of claim 1, wherein the stopper is provided such that it is non-rotatable around the rotation axis relative to the carrier.

12. The speed reducer of claim 1, wherein the stopper is provided such that it is rotatable around the rotation axis relative to the carrier.

13. The speed reducer of claim 1, wherein the stopper has a first end surface and a second end surface opposite to the first end surface; and wherein the stopper is disposed such that the first end surface is in contact with the crankshaft and the second end surface is in contact with the bottom surface of the recess.

14. The speed reducer of claim 1, wherein the crankshaft includes an eccentric portion and a journal, the journal having an end surface facing the bottom surface, and wherein the stopper is in contact with the journal at the end surface to support the crankshaft.

15. A speed reducer, comprising:

a case;

a carrier having a recess therein;

a crankshaft bearing provided on a support surface, the support surface being a part of an inner peripheral surface of the recess and disposed apart from a bottom surface of the recess;

a crankshaft supported by the crankshaft bearing, the crankshaft rotating one of the carrier and the case relative to the other of the carrier and the case; and a stopper preventing the crankshaft and the crankshaft bearing from moving toward the bottom surface in an axial direction of the crankshaft, the stopper facing a clearance portion that forms a part of the inner peripheral surface and has a larger diameter than the support surface, the stopper being in contact with the crankshaft and the crankshaft bearing.

* * * * *